United States Patent [19]
Brydges, III et al.

[11] 3,948,669
[45] Apr. 6, 1976

[54] GLASSES AND GLASS-CERAMICS CONTAINING RUTILE FIBERS

[75] Inventors: William T. Brydges, III; Dennis W. Smith, both of Corning, N.Y.

[73] Assignee: Corning Glass Works, Corning, N.Y.

[22] Filed: Mar. 28, 1975

[21] Appl. No.: 563,153

Related U.S. Application Data

[62] Division of Ser. No. 472,142, May 22, 1974, Pat. No. 3,901,719.

[52] U.S. Cl. .............................................. 106/39.8
[51] Int. Cl.$^2$ .......................................... C03C 3/22
[58] Field of Search ...................... 106/39.8, 50, 51

[56] References Cited
UNITED STATES PATENTS

| | | | |
|---|---|---|---|
| 2,876,074 | 3/1959 | Johnson............................ | 106/51 X |
| 2,920,971 | 1/1960 | Stookey............................. | 106/39.8 |
| 3,899,340 | 8/1975 | Malmendier....................... | 106/39.6 |
| 3,901,719 | 8/1975 | Brydges et al. ................. | 106/39.8 X |

Primary Examiner—Helen M. McCarthy
Attorney, Agent, or Firm—Clinton S. Janes, Jr.; Clarence R. Patty, Jr.

[57] ABSTRACT

This invention is concerned with the production of composite articles comprising a glass or glass-ceramic matrix containing long fibrous single crystals of rutile ($TiO_2$) of very high aspect ratios grown in situ. The glass articles are formed via the heat treatment of a molten batch consisting essentially, by weight on the oxide basis, of about 45-65% $B_2O_3$, 5-30% $Al_2O_3$, 5-30% $TiO_2$, and 3-30% alkaline earth metal oxides and can exhibit greatly improved mechanical strength and toughness when compared with the original, or fiber-free, glass. The glass-ceramic articles are formed by heat treating the fiber-containing glass in a particular manner to cause the development of fine-grained crystals in situ, resulting in a highly-crystalline article containing long fibrous single crystals of rutile exhibiting verh high aspect ratios.

6 Claims, No Drawings

GLASSES AND GLASS-CERAMICS CONTAINING RUTILE FIBERS

This is a division, of application Ser. No. 472,142, filed May 22, 1974, U.S. Pat. No. 3,901,719.

There has been considerable research in the past to improve the mechanical strength and/or fracture toughness of glass bodies by means of fibers dispersed within a glass matrix. Previous attempts to reinforce glass bodies with fibers met with little success principally because of poor dispersion of the fibers, coupled with random orientation thereof, and the difficulty in entraining substantial valume fractions of fibers within the glass matrix.

Glass-ceramic articles are produced through the heat treatment of glass articles to cause the growth of crystals in situ. Because the heat treatment is undertaken in a controlled manner, the crystals developed are characteristically fine-grained and randomly oriented. In general, glass-ceramic articles are highly crystalline such that the physical properties exhibited thereby will more closely approximate those of the crystal phase than those of the parent or original glass. A necessary corollary to this feature is the fact that the residual glassy matrix of a glass-ceramic article will have a far different composition from that of the parent glass since the crystal components will have been precipitated therefrom.

The growth of acicular or needle-like crystals in glass-ceramic articles has been recognized. For example, U.S. Pat. No. 2,920,971, the basic patent in the field of glass-ceramics, reports crystals which can exhibit such morphology. However, the resultant products have been disappointing both from the standpoint of the inherent small size of the fibers so developed and the inabliity to promote significant orientation of the fibers. Therefore, although extensive fiber growth was indeed possible, the small size and random orientation of the fibers has yielded articles wherein the machanical strength and toughness are not substantially different from those exhibited by the conventional fine-grained glass-ceramic article.

The primary objective of the instant invention has been to develop glass and glass-ceramic bodies containing significant numbers of large fibers having high aspect ratios, which fibers can be made to demonstrate substantial single-direction orientation thereby providing a composite body demonstrating greatly improved mechanical strength and toughness, when compared with the fiber-free glass and glass-ceramic.

With respect to glass bodies, this objective can be accomplished by heat treating a molten mass of a glass-forming batch of a particular composition in a manner to cause the growth of large rutile ($TiO_2$) crystals therein. The melt containing the fibers can then be formed into an article of a desired configuration and the fibers caused to orient in a specific direction during the forming step. Glasses operable in the present invention consist essentially, by weight on the oxide basis, of about 45–65% $B_2O_3$, 0–30% $Al_2O_3$, 5–30% $TiO_2$, and 3–30% alkaline earth metal oxides (RO). Calcium oxide (CaO) appears to be the most desirable alkaline earth metal oxide in yielding the largest fibers with the highest aspect ratios, although the presence of magnesium oxide (MgO), strontium oxide (SrO), and/or barium oxide (BaO) will likewise lead to useful fiber growth.

The presence of $Al_2O_3$ is of particular importance in improving the melting and forming characteristics of the glass, as well as enhancing the chemical durability thereof. Therefore, at least about 5% $Al_2O_3$ will desirably be included in the glass composition to obtain the most stable composite bodies with the most desirable fiber growth, and the base glass composition will preferably consist esentially, by weight on the oxide basis, of about 50–65% $B_2O_3$, 15–25% $Al_2O_3$, 5–20% $TiO_2$, and 3–15% RO.

Careful control is demanded in heat treating the molten glass. Thus, the melt is subjected to a temperature which not only lies below the $TiO_2$ liquidus but which also is sufficiently elevated to obtain the low viscosity necessary to promote the growth of single crystal rutile of the desired long fibrous morphology. Hence, the temperature and viscosity of the liquid glass are in such relation that the rate of crystal development leads to large crystals demonstrating substantial unidirectional growth rather than an undesirable, fine-grained, heterogeneous crystallization. Each glass composition will exhibit an optimum temperature for growth of rutile crystals but, in general, the operable temperatures will range between about 1100°–1250°C.

The amount of rutile crystallization developed is dependent upon at least three factors: (1) the $TiO_2$ concentration in the glass; (2) the overall parent glass composition; and (3) the time alloted for crystallization to proceed. Normally, at least one-half hour will be required even at the highest concentrations of $TiO_2$ with, customarily, times of an hour or more being utilized to insure greater amounts of crystallization. However, excessively long exposure times, viz. greater than about four hours, can result in the growth of randomly-oriented, fine-grained devitrification which may interreact unfavorably with the desired large fibers having high aspect ratios. In sum, the most advantageous products will consist solely of long rutile fibers in a glassy matrix.

Optical microscopy and X-ray diffraction analysis have identified the fibers as rutile single crystals with the c-axis along the fiber axis. Fibers up to about 0.5 inches in length were measured with the majority ranging between about 0.1 inches–0.4 inches. Fiber thicknesses generally varied between about 0.001 inches–0.004 inches, yielding aspect ratios up to about 200:1, with 50–100:1 being most common. This characteristic was of vital interest in achieving reinforcement of the matrix glass. When viewed microscopically in cross section, the rutile crystals exhibited a blocky morphology.

The following table reports a group of working examples, expressed in parts by weight on the oxide basis, which are illustrative of the instant invention. Since the sum of these components closely approximates 100, they can, in essence, be deemed as present in weight percentages. The batch ingredients therefor can be any materials, either the oxide or other compound, which, when melted together, will be converted to the desired oxide in the proper proportions. The batch ingredients were blended together in a ball mill to aid in obtaining a homogeneous melt and then run into a platinum crucible. The platinum crucible was placed in an electrically-fired furnace operating at about 1200°–1300°C. and the batch melted for 4 hours, generally with stirring. Thereafter, the crucible was either transferred to a furnace operating at 1100°–1250°C. or the temperature within the melting furnace reduced to that range.

In either practice, the crucible containing the molten glass was maintained within that temperature domain for about ½-2 hours to cause the growth of crystals. Thereafter, the molten glass was poured onto a steel plate. By applying moderate pressure upon the slab so-formed while it is still somewhat viscous, the fibers can be aligned in the direction of stress. The slabs were annealed by being placed in an annealer operating at about 450°–475°C.

Advantageously, the slab will be permitted to cool below a temperature at which the glass can be formed (deformation temperature) before being transferred to the annealer. Placing the slabs directly into the annealer while very hot can, in some instances, result in the growth of heterogeneously-shaped devitrification in the glass phase.

$Sb_2O_3$ is present in its conventional capacity of a fining agent.

metal oxides can be tolerated with the total of all such inclusions being preferably less than about 15%.

In general, the common glass forming oxides such as $SiO_2$ and $P_2O_5$ will be avoided since the solubility of $TiO_2$ crystals in the consequent melt will be significantly affected thereby. Likewise, the addition of such powerful fluxes as F, $Li_2O$, $Na_2O$, and $K_2O$ will be avoided. Therefore, the total of all such additions will, preferably, be held below about 10%.

Observation of the fiber growth in the molten batch leads to the conclusion that the genesis thereof is primarily due to surface nucleation, i.e., the vast bulk of the crystals begins to grow at the interface between the melt and the crucible and at the air-melt surface interface. This then will promote the growth of acicular crystals perpendicular to the interface when the viscosity and temperature of the melt are proper.

Inasmuch as the preferred internal microstructure of

TABLE

|  | 1 | 2 | 3 | 4 | 5 | 6 | 7 | 8 | 9 | 10 | 11 | 12 |
|---|---|---|---|---|---|---|---|---|---|---|---|---|
| $B_2O_3$ | 52.5 | 63.9 | 56.9 | 59.7 | 60.4 | 59.4 | 58.4 | 57.4 | 56.4 | 48.4 | 61.0 | 51.5 |
| $Al_2O_3$ | 20.0 | 20.8 | 18.6 | 19.5 | 19.8 | 19.8 | 19.7 | 19.7 | 19.7 | 30.4 | — | — |
| $TiO_2$ | 10.0 | 10.9 | 9.7 | 10.2 | 8.3 | 9.3 | 10.3 | 11.3 | 12.3 | 9.9 | 26.9 | 15.5 |
| CaO | 6.0 | — | — | 2.9 | 5.8 | 5.8 | 5.8 | 5.8 | 5.8 | 5.5 | 6.1 | — |
| PbO | 5.5 | — | — | — | 5.8 | 5.8 | 5.8 | 5.8 | 5.8 | 5.5 | 6.07 5-.087 | — |
| MgO | — | 4.4 | — | — | — | — | — | — | — | — | — | — |
| BaO | — | — | 14.9 | 7.8 | — | — | — | — | — | — | — | 27.9 |
| BeO | 5.0 | — | — | — | — | — | — | — | — | — | — | — |
| $Sb_2O_3$ | 1.0 | — | — | — | 1.0 | 1.0 | 1.0 | 1.0 | 1.0 | 1.0 | — | — |

With respect to glass-ceramic articles, the above objective can be achieved by subjecting the glass bodies containing the desired large fibers of single rutile crystals to a further heat treatment at temperatures ranging between about 600°–850°C. Since the rate of growth of the crystals is a function of temperature, longer exposure times will be required at the cooler extreme of the crystallization range. However, experience has demonstrated that at least about one-half hour will be demanded to promote a substantial growth of crystals. Much longer times can be employed, e.g., up to 24 hours, with no deleterious effect. Nevertheless, times between about 1–8 hours have been deemed preferred from a practical point of view with regard to the density and character of crystal growth. In general, the crystals grown will be randomly oriented and fine-grained, i.e., less than about 10 microns in diameter.

At temperatures below about 600°C., the rate of crystal growth becomes so slow as to be commercially unattractive. Temperatures above about 850°C. can be utilized but undesirable interreaction with the large rutile fibers is hazarded.

It is frequently customary to cool the fibercontaining glass bodies to room temperature to permit inspection of glass quality prior to crystallizing the body to a glass-ceramic. However, that practice is not required to achieve the desired subsequent fine-grained crystallization. It is only necessary to cool the glass to a temperature below the deformation temperature thereof and expose to a temperature within the 600°–850°C. range.

In general, the starting glass batches will be limited to the quaternary system $RO$-$TiO_2$-$Al_2O_3$-$B_2O_3$ within the ranges delineated above since additions of other components hazard the inhibition of $TiO_2$ crystallization and/or the development of unwanted, secondary crystallization. However, minor amounts of compatible the glass articles consists essentially of long crystalline rutile fibers enveloped within a residual glassy matrix, the total crystallization that can conceivably be present in such article is the full $TiO_2$ content. However, the 2–5% fibers commonly developed within the body frequently produce deep opacity therein and can impart a three-fold improvement in mechanical strength and toughness to the composite.

Where a glass-ceramic article is desired, the fiber-containing glass body is exposed to temperatures between about 600°–850°C. for periods of time in excess of about one-half hour. At all exposure temperatures, X-ray diffraction analyses have evidenced the presence of fine-grained rutile crystallization. At temperatures below about 700°C., anatase (another crystalline form of $TiO_2$) has also been observed whereas, at higher temperatures, all the $TiO_2$ crystals have commonly been identified as rutile. Crystal phases other than $TiO_2$ have been observed, depending upon the glass composition. However, within the preferred glass composition range, the principal secondary phase identified has been $Al_4B_2O_9$ after a 3 hour exposure to 650° or 760°C. Determinations of crystal content through X-ray diffraction have indicated the presence of rutile in the glass-ceramic article in an amount 4–5 times that observed in the parent fiber-containing glass.

We claim:

1. A composite article consisting essentially of long single crystal rutile fibers of high aspect ratios contained within a glass-ceramic matrix, said article having an overall composition consisting essentially, by weight on the oxide basis, of about 45–65% $B_2O_3$, 5–30% $Al_2O_3$, 5–30% $TiO_2$, and 3–30% RO, wherein RO consists of an alkaline earth metal oxide selected from the group MgO, CaO, SrO, and BaO, and wherein the crystal phase of said glass-ceramic matrix consists essentially of fine grained rutile and $Al_4B_2O_9$.

2. A composite article according to claim 1 wherein said fibers range up to about 0.5 inches in length and 0.004 inches in width, with aspect ratios up to about 200:1.

3. A composite article according to claim 2 wherein said fibers range between about 0.1–0.4 inches in length and 0.001–0.004 inches in width, with aspect ratios between about 50–100:1.

4. A composite article according to claim 1 wherein said composition is essentially free from $SiO_2$, $P_2O_5$, $Li_2O$, $Na_2O$, $K_2O$, and F.

5. A composite article according to claim 1 wherein said composition consists essentially of about 50–65% $B_2O_3$, 15–25% $Al_2O_3$, 5–20% $TiO_2$, and 3–15% RO.

6. A composite article according to claim 1 wherein fine-grained anatase is also present.

* * * * *

UNITED STATES PATENT OFFICE
CERTIFICATE OF CORRECTION

PATENT NO. : 3,948,669
DATED : April 6, 1976
INVENTOR(S) : William T. Brydges, III and Dennis W. Smith It is certified that error appears in the above-identified patent and that said Letters Patent are hereby corrected as shown below:

Column 1, line 13, "valume" should be -- volume --.

Column 3, line 55, "fibercontaining" should be -- fiber-containing --.

Columns 3 and 4, in the TABLE, Example 11, after 6.1, delete "6.07 5-.087" and insert -- 6.0 --.

Columns 3 and 4, in the TABLE, Example 12, after the second "-" insert -- 5.08 --.

Signed and Sealed this

Seventeenth Day of August 1976

[SEAL]

Attest:

RUTH C. MASON
Attesting Officer

C. MARSHALL DANN
Commissioner of Patents and Trademarks